(12) United States Patent
Hollberg et al.

(10) Patent No.: US 6,356,955 B1
(45) Date of Patent: Mar. 12, 2002

(54) METHOD OF MAPPING GDMO TEMPLATES AND ASN.1 DEFINED TYPES INTO C++ CLASSES USING AN OBJECT-ORIENTED PROGRAMMING INTERFACE

(75) Inventors: Ulf Hollberg, Wiesloch; Ralf Stefan Ehrlich, Karlsruhe; Ulrich Scheere, Sindelfingen; Olaf Zimmerman, Sandhausen, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/620,808

(22) Filed: Jul. 21, 2000

Related U.S. Application Data

(63) Continuation of application No. 08/602,170, filed on Feb. 15, 1996, now Pat. No. 6,182,153.

(51) Int. Cl.[7] .............................................. G06F 13/00
(52) U.S. Cl. ..................................................... 709/315
(58) Field of Search ............................ 704/1; 707/103, 707/200, 523; 709/200, 228, 232, 315, 316; 714/4, 738; 717/5; 204/192.3; 345/335

(56) References Cited

U.S. PATENT DOCUMENTS

| 4,994,998 | A | * | 2/1991 | Anezaki ........................ 704/1 |
| 5,210,535 | A | * | 5/1993 | Fujita ......................... 709/228 |
| 5,257,371 | A | * | 10/1993 | Anezaki ..................... 707/103 |
| 5,291,583 | A | * | 3/1994 | Bapat ............................ 717/5 |
| 5,418,793 | A | * | 5/1995 | Chang et al. ................ 714/738 |
| 5,418,963 | A | * | 5/1995 | Anezaki et al. ................ 717/5 |
| 5,491,822 | A | * | 2/1996 | Allen et al. .............. 204/192.3 |
| 5,504,906 | A | * | 4/1996 | Lutoff ......................... 709/316 |
| 5,506,985 | A | * | 4/1996 | Motoyama et al. ......... 707/523 |
| 5,517,622 | A | * | 5/1996 | Ivanoff et al. .............. 709/232 |
| 5,519,868 | A | * | 5/1996 | Allen et al. .................... 717/5 |
| 5,530,864 | A | * | 6/1996 | Matheny et al. ............ 709/315 |
| 5,568,605 | A | * | 10/1996 | Clouston et al. ................ 714/4 |
| 5,572,724 | A | * | 11/1996 | Watanabe et al. ........... 707/200 |
| 5,627,979 | A | * | 5/1997 | Chang et al. ................ 345/335 |
| 5,632,035 | A | * | 5/1997 | Goodwin ........................ 717/5 |

OTHER PUBLICATIONS

"TNMSKernel–System kernel of OpS based on TMN–". Technical Report of IEICE. vol. 93 No. 260, SSE93–56, IN93–63, CS93–79, pp. 109~114, 1993 Sep. ikuo YODA, et. al.

"Configuration of Transmission Network Management Programs using GDMO Translator". Technical Report IEICE. vol. 92 No. 287, SAT92–48, CS92–54, pp. 47~54, Oct. 1992 ikuo YODA, et. al.

"Implementation of ATM Transport Network OpS–OpS Development Using TNMS Kernel–" Technical Report of IEICE. vol. 93 No. 337, SAT93–66, CS93–135, pp. 17~22, Nov. 1993 Kouji Yata, et. al.

"Management Platform for TMN Agent System Using Real–Time Operating System" Technical Report of IEICE. vol. 94 No. 370, IN94–120, CS94–148, pp. 91~96, Nov. 1994 Shinobu Sasaki, et. al.

* cited by examiner

Primary Examiner—Robert B. Harrell
(74) Attorney, Agent, or Firm—Scott W. Reid

(57) ABSTRACT

A programming interface for converting network management application programs written in an object-oriented language into network communication protocols. The application programs manipulate managed objects specified according to GDMO/ASN.1 ISO standards. Methods are provided for mapping from GDMO templates and ASN.1 defined types into C++ programming language. The interface has both an object interface composing means for generating code which provides proxy managed object classes as local representatives for managed object classes, and a run time system means for providing proxy agent object classes as representatives for remote agents.

13 Claims, 4 Drawing Sheets

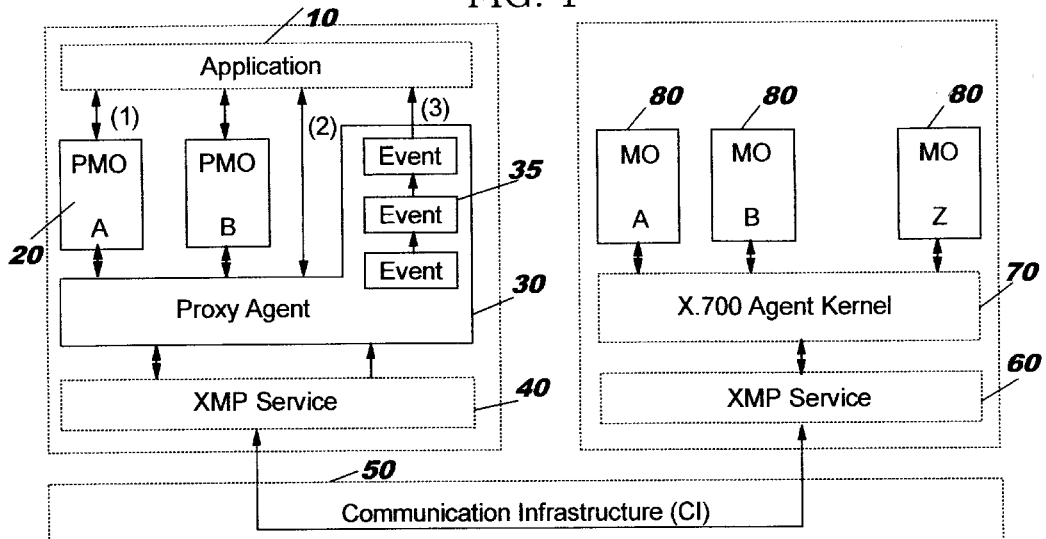

| GDMO Templates | Semantics |
|---|---|
| Managed Object Class | The basic template for the definition of entities of management information. Mainly references GDMO Package Templates. |
| Package | Three possibly empty sequences of names of<br>• GDMO Attribute Templates with annotation for accessibility, initial<br>• value, and value ranges,<br>• GDMO Action Templates and<br>• GDMO Notification Templates |
| Attribute | A reference to another attribute template (and optional modifiers), or a reference to an ASN.1 defined type with an indication on the required operations. |
| Attribute Group | Clusters of GDMO Attributes to allow to reference several Attributes at once under one name. |
| Action | Defines a method of the managed object class and optionally references to ASN.1 defined types for outgoing and incoming information. |
| Notification | References an ASN.1 type for the information which will be passd with the event notification of the defined type. In addition, parts of this ASN.1 structure can be named by Attribute template labels. |
| Parameter | This template permits the specification and the registration of a parameter syntax and behavior that may be associated with particular attributes, actions and notifications. |
| Name Binding | Defines the allowed naming and containment relationship between managed objects. This template is not of direct interest for generating source code for management applications. |

FIG. 5

| ASN.1 Primitive Types | |
|---|---|
| ASN.1 Primitive Types | Semantics |
| null | a type with an empty value "NULL" |
| boolean | Boolean values, this is, "TRUE" or "FALSE" |
| enumerated | a set of named values, for example, enum(red(1), green(2), blue(5)). |
| integer | integer of unlimited range |
| real | real numbers of an unlimited range and arbitrary precision |
| any | depreciated: intended as place holder, not as type |
| any defined by <x> | as any, but <x> identifies the syntax to the application |
| object identifier | a unique identifier |

| ASN.1 String Types | |
|---|---|
| ASN.1 String Types | Semantics |
| bit string | a sequence of bits |
| octet string | a sequence of octets (that is, 8 bits) |
| <x>-string | sequences of characters from some alphabet <x>, for example, IA5String |
| generalizedTime | a general time stamp |
| utctime | a universal time stamp |

| ASN.1 Constructors | |
|---|---|
| ASN.1 Constructors | Semantics |
| choice | a set of named alternatives |
| sequence | a ordered set of named components of various types |
| sequence of <x> | a ordered set of components of the type <x> |
| set | a unordered set of named components of various types |
| set of <x> | a unordered set of components of the type <x> |

# METHOD OF MAPPING GDMO TEMPLATES AND ASN.1 DEFINED TYPES INTO C++ CLASSES USING AN OBJECT-ORIENTED PROGRAMMING INTERFACE

CROSS REFERENCE TO RELATED APPLICATION

This application is a continuation of application Ser. No. 08/602,170, filed Feb. 15, 1996, now U.S. Pat. No. 6,182,153.

A portion of the disclosure of this patent document contains material which is subject to copyright protection. The copyright owner has no objection to the facsimile reproduction by anyone of the patent document or the patent disclosure, as it appears in the Patent & Trademark Office patent files or records, but otherwise reserves all copyright rights whatsoever.

BACKGROUND OF THE INVENTION

This invention is directed to a programming interface for developing and running network management application programs written in an object-oriented language having object class definitions, on a network communication infrastructure wherein the application programs manipulate managed objects that are specified according to the GDMO/ASN.1 ISO standards and are made available at remote management agents through the communication infrastructure. Beyond this it relates to methods for mapping from Guidelines for Definition of Managed Objects (GDMO) templates and Abstract Syntax Notation One (ASN.1) defined types into the C++ language and a platform for the implementation of the interface.

OSI network management applications and CCITT Telecommunication Management Network (TMN) applications are based on the ability to manipulate managed objects which are specified in GDMO/ASN.1 and which are made available at remote management agents through a communication infrastructure.

Currently, XMP/XOM from the X/Open [X/Open XMP] is the only standardized API to the communication infrastructure for management applications. XMP/XOM is cumbersome to use. XMP/XOM based applications are lengthy and difficult to write, understand and debug. Furthermore XMP/XOM does not allow for static (compile time) type checking, so that many type errors show up at run-time. Therefore most programmers certify that using XMP/XOM is cumbersome and time consuming. Implementers of network management applications are thus confronted with the user unfriendliness of the XMP/XOM interface.

In order to promote code quality and reusability more and more applications are written in the object-oriented programming language C++. Even though management information is defined in the object-oriented specification language GDMO, XMP/XOM uses the C language.

Further, managed objects are formally specified in GDMO and ASN.1. Development tools that support GDMO and ASN.1 can, thus drastically reduce the development time of network management applications. Therefore a demand for a C++ embedding to hide the intricacies of XMP/XOM and GDMO based tools to support the development of OSI management applications is ascertainable.

The development of applications within the OSI management framework [ISO 10040] is a rather complex undertaking. The estimated costs for the development of new applications support this perception. In order to boost the development process, additional support by higher-level interface and corresponding tools is required.

SUMMARY OF THE INVENTION

It is therefore an objective of the invention to develop an object-oriented interface (OOI) which provides an, object-oriented abstraction of OSI management information and services for use in regular, non-distributed applications.

A further objective of the invention is to provide an OOI for access to managed objects which is simple to use.

Further objectives of the invention are to relieve the application programmers from most technical details related to communication and XMP/XOM, to provide an object-oriented, strong typed language embedding of management information and management services into C++, to generate automatically methods to manipulate specified managed objects, and to be open to future management paradigms or communication infrastructures, such as OSF-DME.

The requirements for the OOI design thus can be summarized as follows:
1. relieve the application programmers from most technical details related to communication and XMP/XOM;
2. provide an object-oriented, strong typed language embedding of management information and management services into C++;
3. automatically generate methods to manipulate specified managed objects; and
4. be open to future management paradigms or communication infrastructures, such as OSF-DME.

These problems are solved by the features of the invention laid down in the independent claims. The programming interface (OOI) according to the invention provides access to managed objects via telecommunication networks. The Object Interface Composer (OIC) automatically generates C++ class definition and implementation files based on managed object specifications written in GDMO and ASN.1 and thus increases the efficiency of program developers. Using the OOI, a network management application can access managed objects stored at remote agents through methods of those generated classes.

The intricacies of XMP/XOM are hidden from the application programmer by C++ classes. As a result application programmers can concentrate on writing their application instead of having to deal with communication protocols or low level interfaces to the communication stack. The OOI hides the intricacies of the communication infrastructure and particularly that of XMP/XOM behind a programmer-friendly object-oriented C++ operator interface.

As opposed to XMP/XOM based code, OOI based code is concise and readable. The OIC may also comprise means for minimizing the number of generated classes and the number of objects to be handled by an application at run time, i.e., the OIC generates C++ classes for the relevant GDMO templates only. The OOI therefore drastically simplifies the development of management applications by hiding the XMP API below C++ objects.

Furthermore the full embedding of managed objects into C++ allows for strong type checking at compile time, whereas cumbersome debugging is usually necessary for XMP/XOM based applications. Without the OOI, programmers either use the cryptic and C-oriented XMP/XOM API or develop some kind of OOI on their own. Such ad hoc solutions take time to develop and usually lack the support of a source code generator similar to the OIC so that the managed object specification must be manually translated. Those solutions are of course time consuming and error prone. With the OOI, the additional development effort and the weaknesses of ad hoc solutions can be avoided. The OOI Run Time System provides C++ classes which allow convenient access to the Common Management Information Service (CMIS).

Both, the object-oriented interface (OOI) for use in OSI management applications and the related Object Interface Composer (OIC), minimize the effort needed to build the communication related functions of management applications.

An application written on top of the OOI is independent of the management service provider. The current version of the OOI is based on the XMP/XOM [XMP] service, but future versions of the OOI could use a different communication vehicle such as OSF-DME. The application could be ported to a new service provider with minimal effort. The OOI API does not depend upon XMP/XOM so that applications do not need to be rewritten when the OOI is ported to another communication infrastructure.

Preferred embodiments of the interface according to the invention are characterized in the claims. The OOI provides static type checking and is easy to use. The OSI definition of management information is object-oriented, thus the OOI takes advantage of object-oriented design techniques and provides a genuine object-oriented interface written in C++.

Managed objects (MO) are formally described in the GDMO/ASN.1 language. This allows for the automatic generation of MO specific source code. The Object Interface Composer (OIC) takes MO specifications that conform with GDMO/ASN.1 and generates C++ classes that provide methods to manipulate these objects. The OOI further provides methods to manipulate standardized MOs.

Strong typing is commonly defined as the compile time checking of type compatibility in programs; it is frequently used as co-notation of 'static typing'. This means that a correctly compilable program in strong typed language, such as C++, will be guaranteed to be type safe. Type safeness means that variables have a defined type which completely specifies the value range and the permissible operations on the values of the type. Also, constants must be defined as specific values of certain types. This argument also applies to the type checking of parameters of procedures.

The net effect of strong typing is that the compiler will detect and prohibit the invocation of undefined methods on variables and illegal assignments of values of type X to variables of type Y. In this context, illegal means that no appropriate typecast has been defined explicitly.

With respect to object-oriented languages, strong typing is of even greater importance because in these languages it is common to define many application oriented types. In writing distributed applications, debugging is far more complicated than for local programs. Without strong typing, errors may be caused by unintended misuse of defined variables. Obviously, the avoidance of these errors saves debugging time.

Further, type safeness is essential for applications which will be installed in a wide range of network conditions. Using strong typing, the compiler is enabled to perform the compatibility checks for assignment, procedure parameters etc. If the compiler does not guarantee type-safe programs, the type safeness must be enforced at run-time by checking the type compatibility at the right locations in the program, which is by itself an error prone task. The execution time for these run-time checks may reach a non-trivial percentage and thus degrade the performance of the application.

The OOI supports strong, static typing for management applications which work with a known inventory of management information. In addition, the generic part of the OOI supports generic management applications. Finally, to allow the coexistence of generic and strong typed components within the same application, the OOI makes provision for using the same objects through the type-safe and the generic interface. This means that by using the OOI, objects will be allocated and used in a strong-typed manner as long as their types are known at compile time. In addition, objects of types which are unknown at compile time, may be allocated and used via the 'weak' typed interfaces.

The invention is also related to methods for mapping GDMO templates and ASN.1 types into C++ classes. These objects of the invention and the programming interface itself will become clear with regard to preferred embodiments of the invention which are illustrated by the appended drawings.

BRIEF DESCRIPTION OF THE DRAWINGS

FIG. 1 shows the OOI components and their run-time environment.

FIG. 2 gives a tabular overview of GDMO templates and their intended use.

FIG. 5 shows the data types available in ASN.1.

DETAILED DESCRIPTION OF THE PREFERRED EMBODIMENT

Figure 3:
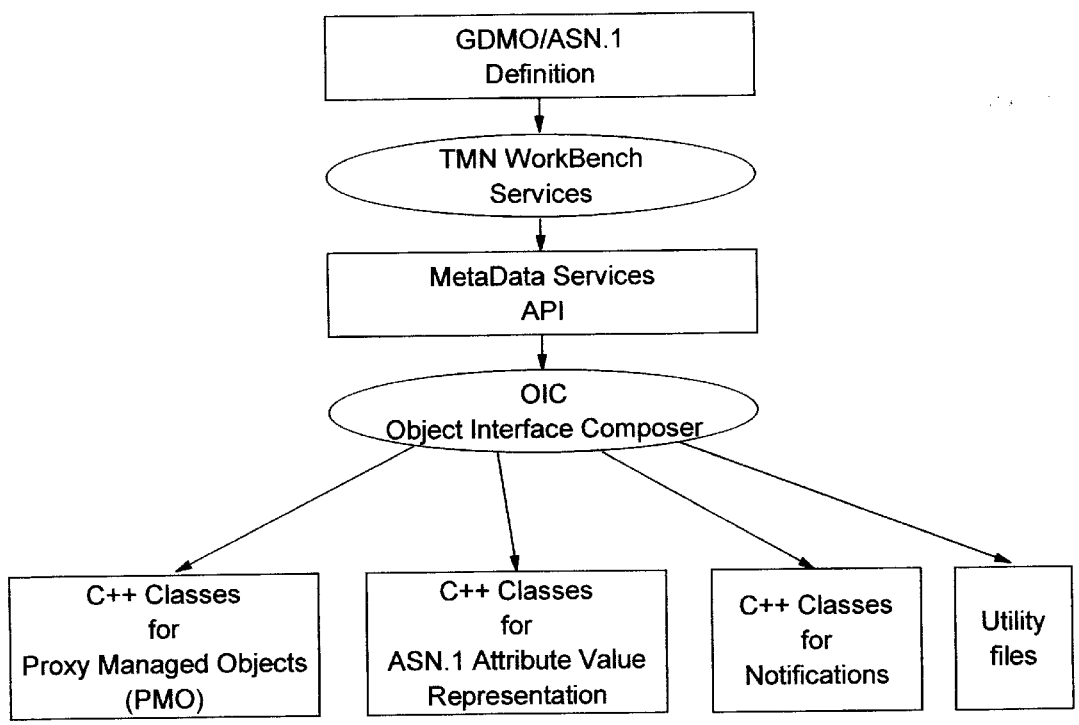
FIG. 3 shows a flow chart of the GDMO/ASN.1 compilation process.

The OOI design is based on the following object-oriented abstractions of the major constituents of OSI management:
1. Management information is represented by managed objects, notifications, and ASN.1 types.
2. Management services are provided by proxy agents.

These abstractions allow the OOI to provide an easy to use programming interface. Furthermore, they separate the OOI implementation from the application, thus allowing for several different OOI implementations which are based on different communication infrastructures, to be exchanged transparently to the application.

FIG. 1 shows the run-time environment of the OOI according to the invention. The OOI components are drawn with solid lines. An application 10 can interact with the OOI through proxy managed objects (PMO) 20 (arrow 1), directly through the proxy agent objects 30 (arrow 2), or through the notification event queue 35 (arrow 3). The OOI uses the XMP API 40 to access the communication infrastructure (CI) 50 which allows it to communicate with an agent 70 that implements the managed objects (MOs) 80.

The proxy agent 30 provides the Common Management Information Service (CMIS) interface as standardized by the ISO [ISO 9595 (CMIS)]. Proxy agents 30 are C++ classes which hide the C-oriented XMP API 40. Proxy managed objects (PMO) 20 are local representatives of remote managed objects 80. PMOs 20 are instances of C++ classes that are automatically generated by the Object Interface Composer (OIC). PMOs 20 provide methods for strong typed access to the ASN.1 values of the attributes of managed objects and to the parameters of actions.

Incoming notifications are stored in an event queue 35. Notifications are instances of C++ classes that are automatically generated by the Object Interface Composer (OIC). Notification classes provide methods for the strong typed access to the ASN.1 values of the information and reply syntax of notifications.

The ASN.1 values of GDMO attributes, of GDMO action information parameters and of notification information and reply syntax are represented by instances of ASN.1 type C++ classes which are also automatically generated from the ASN.1 definitions parsed by the OIC. The ASN.1 type C++ classes provide a set of methods to manipulate the values of the ASN.1 type.

The OOI Run Time System (RTS) and the Object Interface Composer (OIC) thus offer maximum development support for those applications. The OOI Run Time System (OOI RTS) provides easy to use C++ classes to access management information and management services (XMP/XOM). The OIC and the RTS are closely related; in fact the code generated by the OIC must be linked to the OOI RTS to become executable.

The use of strong-typed local representations of remote managed objects and the generation of proxy managed object (PMO) classes with the Object Interface Composer causes a paradigm shift from weakly-typed message-oriented communications programming to strongly-typed local object-oriented programming. This will increase the productivity of regular programmers and enable more programmers to develop management applications.

The OOI provides the following features:
1. Supports management applications written in C++
2. Uses GDMO and ASN.1 definitions as abstract object definitions
3. Uses automatically generated C++ classes from GDMO/ASN.1 definitions (done by the OIC)
4. Relieves the application developer from intricacies of communication interfaces
5. Separates the application from communication interfaces and technologies
6. Provides strong and weak type interface support
7. Provides run-time type information (meta information)
8. Offers a generic communication class (proxy agent) with CMIS functionality
9. Leaves open the migration path towards future communication architectures such as Common Object Request Broker Architecture (CORBA) from Object Management Group (OMG).

These features are detailed in the following sections.

Mapping of GDMO Templates into C++ Classes

GDMO defines several templates for the definitions of management information. Documents such as Desktop Management Interface (DMI) or M3100 define managed objects with those templates. The Object Interface Composer (OIC) parses GDMO managed object definition documents (such as DMI) and generates C++ classes that represent the managed objects. This section briefly describes the templates defined in [ISO 10165-4(GDMO)] and explains how managed objects defined with those templates are mapped into C++ classes by the OIC.

FIG. 2 gives an overview of the GDMO templates and their intended use. The OIC provides great flexibility for the generation of C++ classes for objects defined using the GDMO templates. It was decided not to generate one class for every usage of any template in the parsed document because of the huge number of classes that would have been generated using this approach. Instead, the OIC was configured to minimize the number of generated classes and the number of objects to be handled by the application at run time.

The OIC generates C++ classes for the relevant GDMO templates only. Managed objects are the most relevant objects for management applications. A C++ class is generated for every GDMO managed object class. The C++ classes reflect the inheritance hierarchy defined in the GDMO document.

The major interest of application writers is to get or set the values of the attributes of managed object instances, and to perform actions on them. Generating classes for GDMO packages and GDMO attributes would force the application to traverse two additional objects to get access to the value of an attribute.

However, no classes are generated for GDMO package and GDMO attribute templates. Instead, each managed object class provides methods to manipulate its attributes. Attributes have values which can be complex structures defined in ASN.1. A C++ class is generated for each attribute type defined in the GDMO/ASN.1 document parsed by the OIC. These classes provide methods to manipulate the attribute values.

Access methods to attributes are generated as methods of the managed objects classes of the managed objects that contain the attribute. A C++ class is generated for each ASN.1 type. These classes provide methods to manipulate the values of the attributes.

Also no classes are generated for GDMO action templates. Instead access methods for actions are generated as methods of managed objects without further indirection.

GDMO notifications may arrive more or less unexpectedly at the management application and contain structured information of some types defined in ASN.1. A reply information structure may have to be transferred as a possible confirmation to the notification. Therefore, a C++ class is generated for every GDMO notification template. This class provides appropriate access methods to the structured information. Confirmable notifications have a reply() method. The optional attribute identifiers are used to generate additional access methods. The errorReply() method allows the return of appropriate error information to the issuer of the notifications.

GDMO parameters are not represented by classes. GDMO parameters are rarely used and parameter information can alternatively be transferred through ASN.1 syntax.

GDMO name bindings are not represented by classes. Name binding information is regarded to be of low relevance for management applications.

The Abstract Syntax Notation. One (ASN.1) is used by GDMO to define all values which are transmitted between management applications and agents. As mentioned above, C++ classes are generated for all ASN.1 types.

The following restrictions are introduced to the design to improve the usability and the performance of the OOI: the value clauses limit the value range of GDMO attributes of managed objects. These clauses are of importance to agent implementers but not to application implementers. The OOI could be designed to perform run-time checking on the attribute values ("within range?"), but since this checking has to be done in the agent it is estimated that the performance cost is not justified. The value clause is therefore ignored by the OIC.

GDMO packages are regarded as an aid for the definition of managed object classes. According to the GDMO standard, they are of no interest to management applications at run-time, because the attributes, actions and notifications which are defined within packages must be treated as properties of the managed object classes themselves [ISO standard 10165-4 (GDMO)].

GDMO attribute templates point (at least indirectly through another attribute) to the type of their value defined in ASN.1, assign an object identifier to this type and list the operations to be made available for the applications. The type information is kept in the GDMO attribute meta objects. The value is made accessible directly by the managed object, thus avoiding a superfluous hop and a separate run-time object.

Strong and Weak Typed Usage

In order to support generic applications that can handle any object as well as specific applications that are tailored to handle a well known subset of the objects, all objects can be accessed in strong-typed and in weak-typed fashion.

The weak-typed interface can be used to manipulate objects whose type is not yet known at compile time, e.g. analyzing the result of a scoped get, done when a scoped management request returns the management information for several managed object instances as a list of generic managed object instances.

The strong-typed interface should be used whenever possible to allow the compiler to detect type errors that would otherwise result in CMIP errors (or core dumps in an application that directly uses XMP/XOM API) and to avoid time consuming run-time type checking that affects performance.

Both types of interfaces can be used interchangeably and concurrently within the same application.

Proxy Agents

The proxy agent class is one of the fundamental abstractions of the OOI. The proxy agent provides the Common Management Interface Service (CMIS). A proxy agent object acts as a proxy for a real, remote agent. Proxy agent objects are local to the management applications. Agents are not aware of the existence of proxy agent objects. Proxy agent objects hide the XMP-session and the XMP-context C-structure and the related XMP operations behind convenient methods of the proxy agent class.

Proxy Managed Objects

Proxy Managed Objects (PMO) are stateless representations of managed objects that are instantiated in agents. Each PMO C++ class provides a set of object class specific methods through which a management application can conveniently submit CMIS requests to query or manipulate the real managed object in the agent. A management application typically instantiates an instance of a PMO class for each real managed object that it wishes to interact with.

Meta-Information

Meta-information provides the type information derived from GDMO/ASN.1 specifications which is made available at run time.

For the OOI, the presence of meta-information is essential to support the mixed usage of strong- and weak-typed interfaces. The meta-information will most likely be used for the conversion between the binary and string representation of objects. In addition, the meta-information of ASN.1 objects is used for encoding and decoding of their values.

For the OOI, every GDMO/ASN.1 object has a pointer to its meta-information object. All instances of one class share the same instance of meta-information object.

The OOI Environment

The OOI Environment object has a single instance in the applications, in order to cluster those objects which belong to the OOI, e.g. proxy agents or meta-information objects. The OOI Environment becomes visible to the programmer at initialization time and when the application should wait for the first event which happens on any of the existing proxy agent objects, i.e., on any of the active XMP sessions.

GDMO/ASN.1 Object Interface Composer

The Object Interface Composer (OIC) is a tool for the generation of source code based on the specifications of management information in GDMO and in ASN.1. It takes its input from managed object class definitions written in accordance with the ISO standard "Guidelines for the Definition of Managed Objects" (GDMO) [ISO 10165-4 (GDMO)] and generates C++ classes (header and implementation files) for the managed-objects, ASN.1 types and notifications defined in the selected document. The Object Interface Composer (OIC) therefore serves as a GDMO/ASN.1 compiler generating C++ classes for XMP/XOM from GDMO/ASN.1 definitions. The computer program listing of U.S. Pat. No. 6,182,153, incorporated by reference, illustrates C++ classes generated for GDMO managed objects and ASN.1 notifications.

The OIC is based on the IBM TMN WorkBench/6000 [WorkBench] product. GDMO and ASN.1 documents are parsed and stored in a relational database or in a shared library by the Managed Object Compiler (MOC) of the WorkBench. The Workbench then provides the GDMO and ASN.1 information through an API.

The OIC generates:

a C++ class for every GDMO managed object class;

a C++ class for each ASN.1 type;

a C++ class for every GDMO notification;

meta information data structures for GDMO and ASN.1;

a set of utility files.

The GDMO/ASN.1 compilation process is shown in greater detail in FIG. 3 and is described in the following.

Proxy Agent Objects

Proxy agent objects are local to the management applications. Agents are not aware of the existence of proxy agent objects. Proxy agent objects hide the XMP session and context C-structure and the related XMP operations behind convenient methods of the proxy agent class. The implementation of the proxy agent class is provided in Listing 1 in the computer program listing of U.S. Pat. No. 6,182,153.

The proxy agent implementation provides synchronous and asynchronous methods. Synchronous methods do not return control to the application until a request is fully processed. Using synchronous OOI methods, a single process application blocks for an undetermined time while a CMIP request is being processed. This behavior may be appropriate for very simple applications, but not for an application that is user-interactive.

Asynchronous methods return control to the application as soon as a CMIP request is sent.

Proxy agent objects provide a service interface to the create, get, set, action, cancelGet and delete operations of CMIS. This service is used internally by the OOI implementation of proxy managed objects and by generic management applications which want direct access to a CMIS interface without using the proxy managed object abstraction. This interface is not directly used by applications which access managed object information through the proxy managed object (PMO) abstraction.

Incoming notifications are queued in the event queue 35 of the responsible proxy agent 30. The application can thus process notification at its leisure. The OOI optionally can trigger an application callback upon receipt of a notification.

Two distinct implementations of proxy agents for direct addressing (DA) and for non-direct addressing (NDAPA) are provided. A direct addressing proxy agent (DAPA) can connect to one specific agent at a time. DAPAs can be used by management applications which communicate with one specific agent. DAPAs are implemented in the "Proxy-AgentDA" C++ class. Non-direct addressing proxy agents (NDAPA), are not connected to specific agents. For each management request, the agent must be addressed in one of two ways: explicitly by supplying an addressing parameter as part of the request and implicitly through the object registration service (ORS). In this case, XMP determines the agent's address with the help of the ORS directory service based on the object class and the object instance information of the request. NDAPAs are implemented by the "Proxy-AgentNDA" C++ class.

Direct Addressing Proxy Agents (DAPA)

A DAPA object represents a real, remote agent. The connect() method with appropriate parameters will establish a connection (XMP session) to this agent. The disconnect methods will release that session binding.

The creation of a direct-addressing proxy agent object in a management application for use with a specific agent neither implies, that this agent exists, nor that it can be connected. No verification is done when the DAPA object is created. The initial state is disconnected.

The management application must explicitly try to connect the DAPA object to a real agent. This attempt may fail. If the connect succeeds, the DAPA object is in state "connected" and is able to transmit management requests to that agent. Internally, the connection between the DAPA and the agent is based on an XMP session.

The management application can explicitly disconnect a DAPA from the agent. A connection can also be aborted by the agent or by the management information service provider. The DAPA object is then in the "disconnected" state and can be reconnected to the same agent or to any other agent.

Non-Direct-Addressing Proxy Agents (NDAPA)

A management application can instantiate only one indirect addressing proxy agent object. The successful creation of an NDAPA does not imply, that there is an agent available for communication. No verification is done when the NDAPA is created. The management application must explicitly try to connect to the postmaster daemon process. Using the connect() method, a non-direct addressing XMP session is established. This session remains active until the management application or the postmaster closes it. As long as the NDAPA object is in the connected state, it can be used to communicate with any agent. The postmaster daemon process directs network management information between multiple applications and agents running concurrently. The postmaster determines the route by using specified addresses or a routing table that is configured in the object registration service.

Mixing DAPA and NDAPA

Several DAPA objects and one NDAPA object may exist in the same management application at the same time. Each of the connected proxy agents has a connection (XMP session) with the agent. The OOI design intends that a management application should only connect one proxy agent object to a specific real agent. If the application tries to use two DAPA objects to communicate with the same agent, or uses a DAPA and the NDAPA to communicate with the same agent, the noticeable effects are strictly dependent on the behavior of XMP and the postmaster. In such cases it is possible that event forwarding discriminators created over one proxy agent object cause notifications to appear on a different XMP session and consequently, in the event queue of a different proxy agent object.

Operations Provided by Proxy Agents

Management operation can be performed on one or more attributes of one or more objects. The proxy agents provide the full set of CMIS services with all parameters as defined in the standard [ISO 9595 (CMIS)]. The resulting structure of the argument and result parameters of the CMIS operations of the proxy agent interface are complex. Therefore, a set of additional methods "simple-create", "simple-get", "simple-set", "simple-action" and "simple-delete" is provided with fewer and simplified parameters to perform operations on only one attribute of one managed object or on several attributes of a single managed object.

The following methods to inquire as to the state and properties of a proxy agent are provided:

The connect() method establishes an XMP binding between the proxy agent and an agent or the postmaster.

The disconnect() method terminates the XMP binding between the proxy agent and an agent or the postmaster.

The isConnected() method checks whether the proxy agent is in the connected state or not.

The id() method returns the local id for the proxy agent. The id can be used to distinguish this instance from other instances of proxy agents within the same application.

The fileDescriptor() method returns the file descriptor (e.g. in AIX) which is associated with the XMP session. The AIX file descriptor is needed for advanced applications which want to write their own AIX 'select' call, e.g. to synchronize between OOI and Xwindows.

The reset() method terminates all activities associated with the proxy agent and re-establishes its initial state, including a disconnect().

The following methods to access and modify the underlying XMP data structures are provided:
XMPSession() returns a reference to the XMP session which is associated with the proxy agent instance.
contextControls() returns a reference to the XMP context object.
sessionControls() returns a reference to the XMP session object.
setPresentationModule() replaces the defined presentation module.

The following methods to inquire as to the state and properties of a proxy agent are provided:
dump() prints out the complete internal status of the proxy agent instance.
dumpRequestQueue() prints out the elements of the queue that stores requests to be sent to the agent.
dumpCompletedQueue() prints out the elements of the queue of requests to which the agent has replied.

The following methods offer the full CMIS functionality:
MCreate() creates a managed object instance at an agent's site MDelete() deletes one or more managed object instances at an agent's site MGet() gets attribute values of one or several managed objects from an agent MSet() replaces the values of attributes of one or several managed objects at an agent MAction() invokes an action of one or several managed objects at an agent.

The following methods are provided for easy to use synchronous CMIS functionality:

simpleMCreate() creates a managed object instance at an agent's site simpleMDelete() deletes a managed object instance at an agent's site simpleMGet() gets one attribute of a managed object from an agent simpleMGetSome() gets some attributes of a managed object from an agent simpleMset() replaces one attribute of a managed object at an agent simpleMSetSome() replaces some attributes of a managed object at an agent simpleMAction() invokes the action of a managed object at an agent.

The following methods to wait for the completion of a request or a notification are provided:

wait() waits for a specified amount of time;

poll() checks with XMP whether something has arrived.

The following methods to inspect the local state of the proxy agent are provided:

HasNotificationQueue() checks whether this instance has a notification queue, i.e. is prepared to receive notifications notificationQueue() returns a reference to the notification queue of the proxy agent requestQueue() returns a reference to the request queue of the proxy agent completedQueue() returns a reference to the completed queue of the proxy agent.

The implementation of the queues used by proxy agent objects is provided in Listing 2 in the computer program listing is U.S. Pat. No. 6,182,153.

The Event Queue

The proxy agent objects 30 contain an externally visible event queue object 35 where the received notifications are stored as typed objects (see arrow 3 in FIG. 1). Notifications are received at any time when the proxy agent 30 is receiving messages from its XMP session. The management application may process the notifications in the queue 35 at any time.

The event queue 35 is optional. A different constructor can be used for proxy agents whose role does not include monitoring so that they will never receive any notifications. The notifications are represented by typed notification objects. They are inserted into the event queue of their proxy agent instance as soon as they arrive at the XMP session. Notification objects remain in the event queue, until they are explicitly deleted by the delete() method. For confirmable notifications, the application should invoke the errorReply() or the reply() method before the delete() method, otherwise the agent waiting for the confirmation might get confused.

For direct-addressing proxy agents, the source of the notification is the specific agent, whereas for indirect addressing proxy agents, the source can be any agent (excluding those for which an direct-addressing proxy agent with role monitoring exists in the same application). The requestor address of the sending agent and the requester title of the sending agent are not available from XMP.

For asynchronous requests, a request object is allocated by the application and passed to the OOI. This object contains a list, which will be used to collect all replies to this particular request, regardless of whether the replies are successful results or error results. The application explicitly passes control to the OOI run-time system (RTS) by invoking a method to check upon or to wait for the reception of incoming messages.

Wait Methods

Since several proxy agent objects may exist at the same time in the same application, several wait methods are available:

The global wait method returns if anything was received on any proxy agent object, (i.e. on any XMP session).

The wait method of the proxy agent returns if anything was received on that session.

The wait method of the request object returns if anything was received on that request object.

It is necessary to distinguish between a single-event-mode wherein only a single incoming response or notification indication is received, added to the related queue and returned to the application, and a wait-for-completion-mode wherein partial replies to outstanding requests do not cause the end of the wait method. A completed request or a notification will end the wait of the application.

Request Objects

Request objects represent asynchronous requests which the application intends to send or has sent to a remote agent. These objects contain all the information needed to keep track of the request, to synchronize with the reply and to access the results or error information. The implementation of the request class for the OOI is provided in Listing 3 in the computer program listing is U.S. Pat. No. 6,182,153.

Request objects must be explicitly created and deleted by the application. Request objects can be reused several times.

The following methods to inquire as to the status of a request object are provided:

confirmationMode() returns a reference to the actual confirmation mode of the request, toBeConfirmed() checks whether the confirmation mode is set to "confirm"

waitMode() distinguishes between the single event of completion mode for wait methods invokeId() returns the invocation identifier state() returns the processing state, e.g. 'outstanding' stateAsString() returns the processing state as a string isIdle() queries whether the state, is "idle"

isOutstanding() queries whether the state is "outstanding"

isCompleted() queries whether the state is "completed"

completionState() returns the completion state, completionStateAsString() returns the completion state as a string isNormallyCompleted() queries the completion state, isCouldNotBeIssued() queries whether the completion is due to a local error isAbandonedByUser() determines if the user has aborted the request isAbortedByProvider() determines if the service provider, e.g. XMP, aborted the request errorOccurred() checks if an error occurred numberOfResultElementsReceived() returns the number of results in the result queue numberOfServiceErrorsReceived() returns the number of service errors encountered during processing numberOfNonServiceErrorsOccurred() returns the number of non-service errors The following methods to update data members of a request object, if the request is not in state "outstanding", are provided setWaitMode() sets the value of the wait mode of the request object reset() aborts any outstanding activity and re-establishes the initial state of the object abandon() aborts the outstanding activity by calling the XMP abandon method including cancelGet() in case of a get request wait() waits for a partial result or for the completion of the request depending on its wait mode hasAttribute() checks whether the request did return an attribute with the passed OID receiveAttribute() receives an attribute with the passed OID receiveNextAttribute() is an iterator method receiveActionReply() receives the reply of an action (if the request was to execute an action)

dump() formats the actual state of the request object into an "ostream" object.

Request objects must be explicitly deleted by the application, even if the related proxy agent is deleted. All response queue elements included in the request object are automatically deleted with the request object. Additional incoming responses are also deleted.

An application may delete a response queue after all results have been received by means of the class destructor. An abandon/cancel operation on the outstanding operation does not delete the response queue (the queue has to be deleted explicitly).

Responses cannot be received after the proxy agent object was deleted or disconnected from the communication system either by the application or by failure.

Callbacks for the Reception of Incoming Messages

When using several asynchronous requests at the same time, replies may appear in any order. To facilitate the processing of arriving reply messages, the OOI offers the possibility of defining callback methods, which will be activated as soon as a reply message or a notification has been received. The OOI is single threaded, therefore callbacks are invoked only during wait() or poll() calls and not while the application is processing.

The OOI distinguishes four different tasks for reply callbacks, and therefore there is the possibility of registering four different callbacks per request:

partialReply() is called for every successful linked reply message from XMP errorReply() is called for every unsuccessful reply message from XMP completed() is called upon reception of the "final" reply from XMP disconnected() is called during the disconnect processing which might have been triggered by XMP or the application.

Incoming responses for pending requests are represented by objects which have been derived from the ASN.1 definitions of CMIP. These objects are put into the reply queue of the request object. The implementation of the response class for the OOI is provided in Listing 4 in the computer program listing of U.S. Pat. No. 6,182,153. Incoming notifications are represented by objects which also have been derived from the ASN.1 definitions of CMIP. These objects are put into the event queue of their proxy agent. Then the callback method incomingNotificationCallback() which is defined by the application for the notification queue is executed with the notification object as parameter.

The callback informs the application that something has been received, and that the queue structures were updated. Thus when the callback is invoked, the object is already in the queue. The steps in a partial response for an outstanding request are:

1. The response object is added to the response list of the request object. This includes updating of all related information of the request object, 'numberOfResponse' information.
2. The partialReplyCallback() or errorReplyCallback() is invoked.

The steps in a final response for an outstanding request include the following steps in addition to the partial steps for response callback:

1. The request object is updated. Its state is changed to "completed". There is no "final response object" added to the response queue.
2. The request object is moved from the requestQueue to the completedQueue
3. The final callback requestCompletedCallback() is called.

Incoming notification

1. The notification object is added to the notification queue. This includes updating the information in the notification queue header.
2. The incomingNotificationCallback() method is invoked. This scheme allows the application to modify the queue structures, e.g. to 'unlink' the received data from the response objects in order to avoid copying. Some higher level receive methods may modify the queue structure, e.g. methods like getSubordinates(), which convert the data of the response queue into a list of proxy managed objects.

Mixed Processing of Synchronous and Asynchronous Requests

It is assumed that the application has issued one or more asynchronous CMIS requests. It then decides to send out a synchronous request. While the synchronous request processes, the complete application waits. In the meantime, responses for the asynchronous requests or notifications may arrive.

In order to receive the reply for the synchronous request, the OOI must receive any message from the XMP session of the proxy agent object which was used for the synchronous call. All callback methods defined for the incoming messages will be executed to preserve the semantics and to guarantee the highest responsiveness possible.

It can be argued whether the same approach should be used for the other proxy agents with outstanding requests. For those, the decision was made against receiving to avoid unnecessary pre-reception of messages.

Flow Control

The OOI design tries to avoid re-implementing functionality that is already covered by lower layers in the communication stack. Therefore, the OOI relies on the flow control mechanism of XMP and of any other underlying components. The application is responsible for being responsive enough for retrieving the data quickly from XMP. Otherwise purging on XMP level and below may occur. There is a recommendation related to the IBM XMP implementation, which recommends receiving as much data as available as fast as possible. The OOI does not do internal buffering to avoid uncontrollable memory consumption in the manager application.

Using the asynchronous OOI, the manager application has all the mechanisms needed to receive messages from the agents as quickly as it seems advisable from the viewpoint of the application. The OOI receives messages from XMP during the processing of one of the several wait methods. Depending on the properties of the outstanding request objects and the kind of messages which arrive, one or more messages are received from one or more XMP sessions. The provision of callback functions which can handle every message from XMP as soon as it arrives, gives maximum control to the application.

Proxy Managed Objects

Specific management applications can be designed with and rely upon the specific knowledge of managed object classes and of their attributes, which have been defined in GDMO and ASN.1 prior to the development of the application. For those applications, the managed object and attribute templates defined in GDMO are automatically compiled into concrete classes with complete implementation in C++.

Proxy managed objects (PMO) are local representations of managed objects that are instantiated in agents. PMO C++ classes provide a set of methods through which a management application can conveniently call CMIS requests to query or manipulate the real managed object in the agent. A management application typically instantiates an instance of a PMO class for each real managed object that it wishes to interact with. PMOs may also be created as a result of OOI methods, e.g. getSubordinates().

The Object Interface Composer (OIC) generates a proxy managed object (PMO) C++ class for every managed object class (MOC) defined in the processed document. Each generated PMO class provides type-safe methods for the access to the mandatory and optional attributes and for the execution of the actions of the managed object. Type safe methods enforce strong typing and make up the strong-typed interface of the generated PMO.

In addition to the strong typed methods, every PMO inherits from the OOIProxyMO class a set of generic methods called the "weak-typed" interface of the PMOs. These methods are intended for management applications or components which do not know at compile time, which classes of managed objects might appear from some agent at run time. It should be noted that these generic methods can also be used for generated PMOs, but will execute less efficiently due to the necessary dynamic type checking done at run time. The implementation of the proxy managed object (OOIProxyMO) class is provided in Listing 5 in the computer program listing of U.S. Pat. No. 6,182,153.

Figure 4:
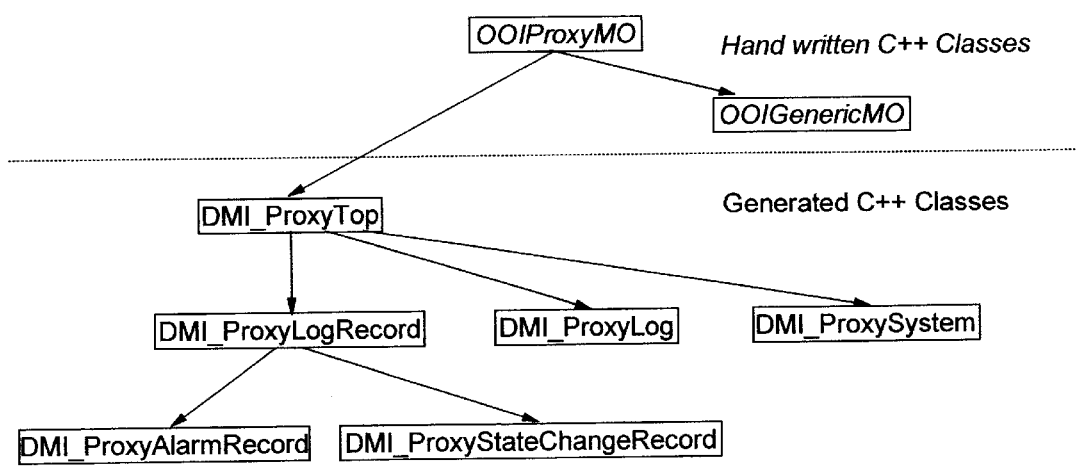
FIG. 4 is an example of a inheritance structure for DMI managed object classes.

The inheritance relation between generated PMO classes in C++ reflects the inheritance relation of the MOCs defined in GDMO/ASN.1 documents. In FIG. 4 an example of an inheritance structure for DMI MOCs is shown. As can be seen in FIG. 4, all generated, strong-typed PMO Classes are derived from the DMI_ProxyTop PMO class which in turn is derived from the OOIProxyMO class. All methods of the OOIProxyMO and DMI_ProxyTop classes are thus inherited by all proxy managed object classes.

The OOIProxyMO and OOIGenericMO classes are hand-coded as part of the OOI run-time environment. The DMI_ProxyTop class and each of its subclasses are generated by the OIC. The DMI_Proxy System subclass generated by the OIC is provided in Listing 6 in the computer program listing of U.S. Pat. No. 6,182,153.

The OOIGenericMO class is used to handle managed objects whose types are not known at compile time. This feature allows the programmer to write generic applications or provide for the handling of new objects that will be defined after the application has been completed.

Storage Management

For the storage management of the OOI, it is assumed that the OOI will allocate objects and pass them to the application. The application must release all allocated objects which it received from the OOI. The OOI will only manage those objects which are used internally and which are not made visible to the application. Upon reception of data from XMP, only the OOI knows its type, and must therefore allocate the object of the correct type, and after passing of such objects to the application, the OOI does not know when the application has finished using them.

The destructor of the OOI objects will take care of the proper deletion of contained objects.

All methods are inherited from the OOIProxyMO class according to the semantics of the C++ language.

Constructors and Destructors of OOIProxyMO

Two constructors are available for OOIProxyMO objects; both expect as parameter the agent on which the MO resides and a pointer to the meta info object. One of these additionally accepts the distinguished name of the object as parameter. In any case, the name can be set explicitly by the setMOInstance() method. Both direct-addressing proxy agents (DAPAs) and non-direct addressing proxy agents (NDAPAs) can be used as parameters. The copy constructor and the assignment constructor have been explicitly disabled for the OOIProxyMO class and its subclasses. Copy constructors are not provided to avoid the automatic generation of multiple instances of proxy managed objects of the same managed object instance within one application.

Destructors are provided for each ProxyMO subclass. Both constructors and destructors report errors through the exception mechanism.

The following methods are inherited from the OOIProxyMO class by each proxy managed object class:

setAgent() method can be used to overwrite the reference to the ProxyAgent object.

setMoInstance() method can be used to overwrite the distinguished name.

<< print operator creates a formatted printout of the MOC and managed object instances (MOI) values of the PMO.

agent() method returns a pointer to the ProxyAgent object on which the managed object resides, moClass() method returns a reference to the CMIS_ObjectClass (the MOC may not be known if the object is the result of a scoped MGet operation), moClassIdo() method returns the name of the class as a reference to an OOIString, moInstance() method returns the distinguished name of the MO as a reference to a CMIS_ObjectInstance, metaInfo() access method retrieves the run time Meta information (i.e. structural information specified in the GDMO MO class definition), hasConditionalPackage() access method determines the presence of a conditional package, reset() method re-establishes the initial status of the object.

Strong-Typed Methods of PMO

The OIC generates C++ header and implementation files for every managed object class defined in the parsed GDMO document. Each PMO class provides type safe methods for the access to attributes and for the execution of the actions of the managed objects. Those methods are said to be strong-typed.

As for their superclass, the strong-typed PMO classes have disabled default, copy and assignment constructors. The constructor for a typed PMO expects the proxy agent on which the MO resides and the distinguished name of the MO instance as parameters; both are defaulted to NULL and can be modified later on by using the local utility methods setAgent and setMOInstance, which have been described above. The class of the represented MOC is known by,the type of the proxyMO. Constructors and destructors report errors through the exception mechanism.

Multiple Inheritance

GDMO allows the definition of managed object classes being derived from more than one superior class (multiple inheritance). This section describes how the OOI represents multiple inheritance of managed object classes in the generated C++ classes.

The basic properties of the OOI representation are:
1. The class hierarchy of the OOI proxy managed object classes strictly follows the inheritance structure imposed by the GDMO definition. This includes multiple inheritance.
2. The same holds for the representation of meta information: in case of multiple inheritance, a meta info object for a managed object class has multiple "superior" references.

Even though C++ offers multiple inheritance, C++ has some serious restrictions. A simple mapping of GDMO multiple inheritance to C++ multiple inheritance is not feasible as will be explained below.

As long as multiple inheritance is used in order to inherit from different base classes only, C++ works fine. However, in case of a common base class for different inheritance paths, C++ problems arise. In order to have only one instance of the common base member variables, which is what is normally needed, the base class has to be made a "virtual" base class. Then however, C++ no longer supports casting between base class pointers and sub-class pointers.

This restriction is not acceptable for the OOI, since for internal reasons (decoding), as well as for the user model (which is to support generic and type safe usage in a mixed fashion), the ability to cast pointers is a must. Furthermore, experiments have shown, that today's C++ compilers impose a very large size overhead per instance.

As described above, the main problem of C++ is not related to multiple inheritance itself, but to the use of virtual base class annotation. Thus the basic approach is to avoid this annotation, and to handle the "virtual" base class property by other means. The original purpose of making the base class virtual is to avoid having multiple instances of the base class members.

In case of OOI proxy managed objects, this property is needed. Duplicated instances of the "agent-reference" or "packages-cache" members within a proxy managed object are unacceptable. The OOI approach is to move the "data members" of a proxy managed object out of the proxy managed object class into a separate object called "proxy managed object data" (PMOData). This PMOData object is purely local and completely owned by its corresponding proxy managed object. The original proxy managed object merely contains a pointer to this PMOData object. As required for casting, the original proxy managed object class is not declared as a virtual base class. Obviously, in case of multiple inheritance this may lead to having duplicated pointers to the PMOData. The OOI runtime system guarantees that all these pointers point to the same object during the lifetime of the PMOData object.

The implementation uses the "use-count" paradigm for the PMOData objects: during usage, the "use-count" is equivalent to the number of pointer members of the related proxy managed object, and thus to the number of inheritance paths of a specific managed object class to a common base class.

To the user, this solution is completely hidden. The user is not aware of the existence of multiple pointers, nor of the fact that the proxy managed object data is stored in a separate object. All data and all operations are directly accessible from the proxy managed object interface.

Casting for the C++ proxy managed object classes is achieved by the OOI solution described above. However, in case of multiple inheritance, C++ casting requires specifying the exact casting path (at least at those places with multiple inheritance paths). To simplify this, the OOI offers (as for other classes) a narrow()operator, which allows casting towards subclasses.

In addition, the OOI provides for the proxy managed object classes a widen() operator for casting towards the 'OOIProxyMO' base class. The narrow() operator optionally performs run-time checking, whereas this is not necessary for the widen() operator. Thus there is no need to use plain C++ casts directly.

Notifications

Specific management applications rely upon the specific knowledge of notification object classes which have been defined in GDMO and ASN.1 prior to the development of the application. The implementation of the notification base class for the OOI is provided in Listing 7 in the computer program listing of U.S. Pat. No. 6,182,153. For those applications, the notification templates defined in GDMO are automatically compiled into concrete classes with complete implementation in C++.

The notification objects that are generated from GDMO/ASN.1 definitions by the Object Interface Composer (OIC) are sent to a manager by means of a CMIS event report. The DMI object creation class generated for a DMI object creation notification by the OIC is provided in Listing 8 in the computer program listing of U.S. Pat. No. 6,182,153. The OOI RTS receives notifications and stores them in the event queue of the responsible proxy agent object.

ASN.1

Specific management applications are designed with and rely upon the specific knowledge of GDMO/ASN.1 definitions, which have been defined in ASN.1 prior to the development of the application. For those applications, the abstractly defined ASN.1 types are automatically compiled into concrete classes with complete implementation in C++.

The specification language ASN.1 ("Abstract Syntax Notation 1") has been defined by the ISO to specify the format of transmitted data in a formal, abstract notation. A standardized encoding scheme, such as the "Basic Encoding Rules" (BER) specifies the precise sequence of "bits on the wire". Thus two communicating partners are able to understand each other if they exchange data that is defined in ASN.1 and encoded according to the same encoding rules.

ASN.1 offers primitive types, string types and constructors which can be used to define further application related types. FIG. 5 shows-the types available in ASN.1. In addition to those types, ASN.1 offers the possibility to define named values for some types, and to define several kinds of subtypes.

Mapping Principles

As shown in FIG. 5 there is a set of primitive ASN.1 types and a set of constructors, which are used to compose application oriented complex types.

Base Library: For every primitive ASN.1 type and every ASN.1 constructor, there is a corresponding class in the ASN.1 C++library, e.g. ASN1_Integer; ASN1_SetOf.

Application Types: Each application-defined ASN.1 type is mapped to one or several C++ classes. In the general case, instances of these classes will form a tree structure with instances of ASN.1 constructors as intermediate nodes and instances of primitive ASN.1 types as leaves. The root object of such a tree will be the application defined class which inherits from the outermost ASN.1 constructor class or simple type.

Common Methods: The generated C++ classes and those in the library are derived from a single common class "ASN1_Type". The declaration of functions such as assignment, comparison, print, encoding, decoding, checking, conversion into and from ASN.1 value notation, etc. as virtual methods in the common base class allows for generic usage of all ASN.1 specific C++ classes.

Strong & Weak Typing: The generated C++ classes inherit from the generic library classes. The generated classes offer a strong typing interface while their generic superclasses offer a weak typing interface to the same objects. The examples in the following text will show how both are intended to be used. A very important feature is that both interfaces can be used for the same objects in a mixed fashion. Therefore, it is possible to use generic components together with strong typing components in the same application.

Meta Information: Every ASN.1 C++ class has access to run time type information (meta information) to support a dynamic style of usage in the application. Generic applications, e.g. a graphic application program, rely on this meta information.

Local Types: Any auxiliary type definition, e.g. the values of an enumeration type or the selector type for alternatives of a choice is defined within the scope of the class which uses it in order to avoid name classes in the global scope.

Compatibility: All C++ classes for primitive types are made compatible with the corresponding C++ basic type, e.g. ASN.1 integers are compatible with C++ integers.

Qualified Identifiers: The overall convention for generated names is: "<ASN.1 Module>_<ASN.1 type name>_<ASN.1 component name>", where the module name is a nickname in upper case letters, and the type name is the same as in the ASN.1 source text. The component name is only generated for anonymous component types.

Meta Information

The purpose of meta information is to provide the type information derived from the various GDMO and ASN.1 specifications which is needed by the OOI at run time. Such information may be used directly or indirectly by applications that
1. use the generic interfaces of the OOI (as opposed to the type-safe interface);
2. offer a generic graphical user interface (GUI) requiring conversion to/from string format; and
3. display GDMO meta information to a user.

Typically the meta information is not used directly by applications that only use the type safe interface. Internally, the OOI-Run Time System (RTS) makes use of the meta information.

The GDMO standard 10165-2 defines templates for the definition of management information. The OOI RTS provides meta information about management information specified using the following templates:

Managed Object Class which specifies the names of the mandatory and optional packages of a managed object;

Parameter which specifies the syntax and behavior of parameters that may be associated with particular attributes, operations and notifications;

Attribute which defines admissible operations for the attribute and refers to an ASN.1 type definition;

Attribute Group which specifies a cluster of attributes that can be accessed or operated upon under one name;

Action which refers to an ASN.1 type for outgoing or incoming information; and

Notification which refers to an ASN.1 type for the information that is passed with an event notification of the defined type.

Figure 6:
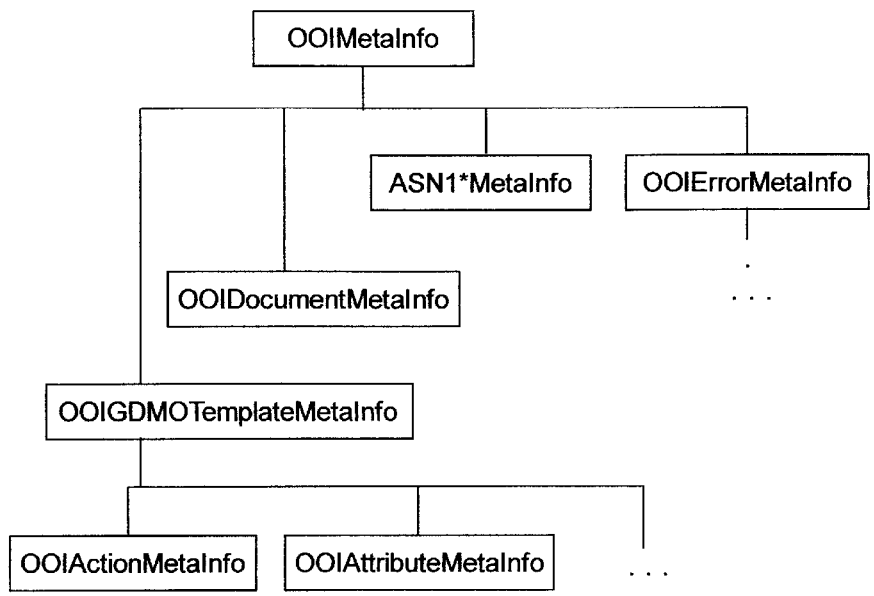
FIG. 6 shows the implementation class hierarchy for meta information.

A C++ class is defined for each of those templates. The Meta Information class hierarchy implementation is depicted in FIG. 6. An instance of this class is instantiated for each GDMO template defined in the GDMO document parsed by OIC. A single instance of the OOIMetaInfoRepository class serves as anchor for the meta information. Additionally instances of C++ classes are generated for each document, each ASN.1 module, and each ASN.1 type defined in a GDMO/ASN.1 document.

The OOI Meta Information can be seen as a data structure which holds most of the information contained in GDMO/ASN.1 documents. This information is stored in a set of objects that provide methods to retrieve specific meta information and to "navigate" through the meta information data structure. For example, the OOIMetaRepository class provides methods to access OOI Document Meta Info and ASN.1 Module Meta Info. Document Meta Information is stored in a list of object instances. Each instance holds or refers to most of the information contained in one GDMO document.

These instances provide methods to access Managed Object Class Meta Info, Parameter Meta Info, Attribute Meta Info, Attribute Group Meta Info, Action Meta Info, Notification Meta Info, ASN.1 Meta Info, which are defined in the document.

OOI Error Handling

Three kinds of errors can be encountered when using the OOI:

1. Application Related Errors,
2. OOI Internal Errors,
3. Communication Errors.

Application related errors occur through incorrect coding of the application. Because the OOI supports strong typing, most coding errors will be detected at compile time, but some errors can only be detected at run-time, e.g. trying to set the hour attribute to the unsupported value of 24 or trying to access a bit outside of a string.

OOI internal errors can be caused by system problems (e.g. resource contingency such as being out of memory), XMP library or system errors.

Communication Errors are ACSE or CMIS service errors. Those errors are expected as they are an inherent part of the protocol definition.

The OOI uses four mechanisms to signal errors:

Boolean return value;

NULL pointers return value;

Error objects returned as function return or through function reference arguments; and Error objects thrown by exceptions.

Error Objects are the preferred error handling method of the OOI. Alternatively, booleans or NULL pointers are returned by some functions to provide additional comfort to the application writer.

Boolean return values are used by functions that are typically used in an evaluation.

NULL pointer return values are returned by Meta Info access methods if the meta information is not available.

Error objects are returned through function reference arguments of the called methods.

Exceptions must be used in C++ to handle failing constructors, because constructors do not support result parameter (hence can't return an error code). Furthermore, exceptions provide a convenient mechanism to indicate internal errors. The OOI throws error objects of the same classes as those used in reference function arguments.

Error Objects

Figure 7:
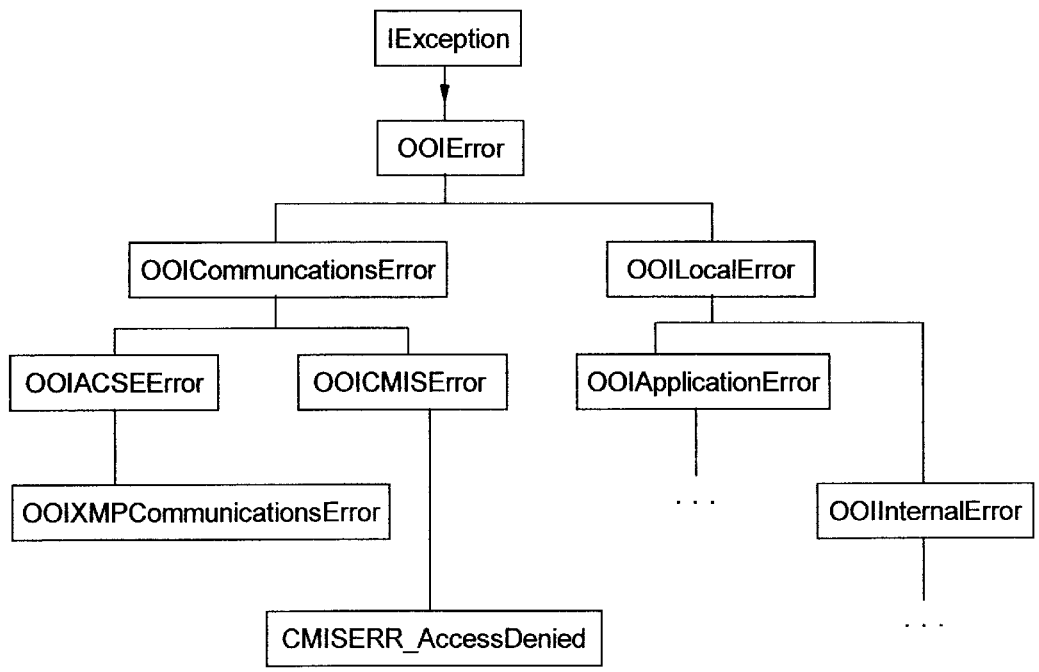
FIG. 7 shows the inheritance hierarchy for error classes.

Error objects are returned by C++ functions through reference arguments or thrown via C++ exceptions. FIG. 7 describes the inheritance hierarchy of OOIErrors.

Communication errors are expected as they are inherent in the ACSE and CMIS protocol operation. Error objects describing communication errors are usually 'returned' and not 'thrown'. Communication errors can originate from the stack interface (currently XMP) or from the CMIS protocol itself.

Methods of OOI Error Objects

OOI error objects usually are allocated by the OOI and passed to the application. It is the responsibility of the application to delete these objects. Constructors are disabled explicitly, but the application may use the copy() method to create a copy of an existing error object.

The following methods for inspecting the kind of error are provided:

isCommunicationsError() checks if the error is of the category communication error isCMISError() checks if the error is of the category CMIS error isLocalError() checks if the error is of the category local error isApplicationError() checks if the error is of the category application error isInternalError() checks if the error is of the category internal error The following general support methods are provided:

name() returns the name of the objects class typeCodeIndex() returns the index of the subclass (used for inspecting/classifying an error, usually followed by::narrow)

<<print operator puts a formatted print of the status of the object into an ostream object asString() returns a string containing the formatted status of the object copy() returns a pointer to a copy of the parameter object metaInfo() returns a pointer to the meta information of the object narrow() performs a type safe conversion into an instance of a subclass For completeness of disclosure, the computer program listing appearing in this application's parent application is hereby incorporated herein by reference in its entirety. The computer program listing illustrates an exemplary implementation of the present invention and having Ser. No. 08/602,170 now U.S. Pat. No. 6,182,153.

Having thus described our invention, what we claim and desire to protect by Letters Patent is:

1. A method for mapping of GDMO templates into C++ classes by means of an object-oriented programming interface wherein a plurality of managed objects are defined by a corresponding plurality of managed object classes wherein the inheritance hierarchy between managed object classes (MOC) is preserved in C++;

the method comprising the acts of:

merging package and attribute templates into managed object classes;

generating access methods to a plurality of values of the attributes for the managed object classes; and providing a method of the managed object class for every GDMO action.

2. The method according to claim 1, wherein the object-oriented programming interface minimizes the number of generated classes and the number of objects to be handled by an application at run time by not generating classes for GDMO packages and GDMO attributes.

3. The method according to claim 2 further comprising generating a C++ class for every GDMO managed object class.

4. The method according to claim 2 further comprising generating meta object instances for every GDMO managed object class.

5. The method according to claim 2 wherein no C++ classes are generated for GDMO packages and GDMO attributes.

6. The method according to claim 2 further comprising accessing the managed objects by a strong typed interface to allow the compiler to detect type errors and by a weak typed interface to manipulate objects whose type is not known.

7. The method according to claim 1 further comprising generating a C++ class for every GDMO managed object class.

8. The method according to claim 1 further comprising generating meta object instances for every GDMO managed object class.

9. The method according to claim 1 wherein no C++ classes are generated for GDMO packages and GDMO attributes.

10. The method according to claim 1 further comprising accessing the managed objects by a strong typed interface to allow the compiler to detect type errors and by a weak typed interface to manipulate objects whose type is not known.

11. A method for mapping ASN.1 defined types into C++ language by means of an object-oriented programming interface wherein a plurality of managed objects are defined by a corresponding plurality of managed object classes, the method comprising the acts of:

generating for every primitive ASN.1 type and every ASN.1 constructor a corresponding class in an ASN.1 C++ library;

mapping each application defined ASN.1 type to at least one C++ class; and wherein instances of these classes form a tree structure with instances of ASN.1 constructors as intermediate nodes and instances of primitive ASN.1 types as leaves and wherein the root object of this tree is an application defined class which inherits from the outermost ASN.1 constructor class or simple type.

12. The method according to claim 11 further comprising deriving the generated C++ classes and those in the ASN.1 library from a single common class.

13. A network platform for implementing an object-oriented programming interface for developing and running a plurality of network management applications, wherein each of the management applications has access to and can manipulate a plurality of managed objects written in accordance with the ISO standards GDMO and ASN.1 and which are accessible at a plurality of remote managed agents, wherein the plurality of managed objects are defined by a corresponding plurality of managed object classes, the object-oriented programming interface including an object interface composing module that generates code which provides a plurality of proxy managed object classes as local representatives for the plurality of managed object classes and a run time system module that provides a plurality of proxy agent object classes as representatives for the plurality of remote managed objects; the network platform comprising:

an interface module including program instructions for the management applications to interact with the object-oriented programming interface through the proxy managed objects, directly through the project agent objects or through a notification event queue; and an access module including proven instructions for accessing a communication infrastructure using an XMP interface which enables the object-oriented programming interface to communicate with an agent that implements the managed object.

* * * * *